Patented Nov. 5, 1929

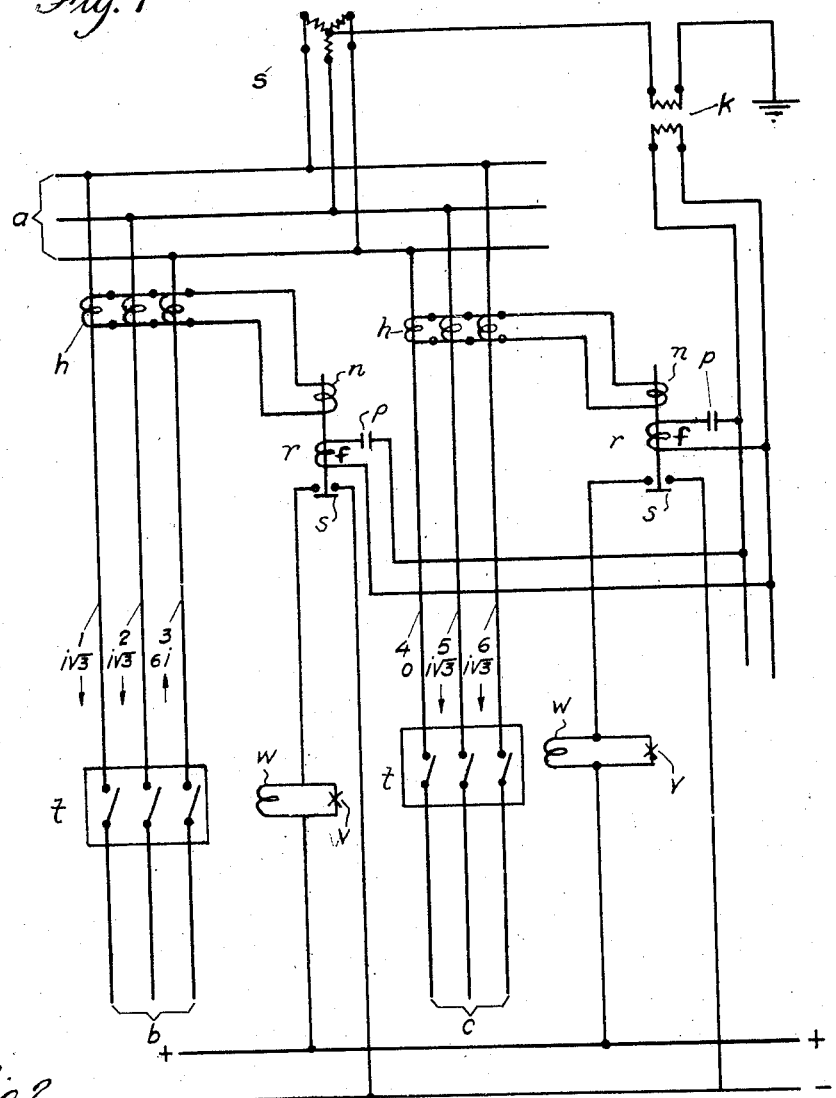
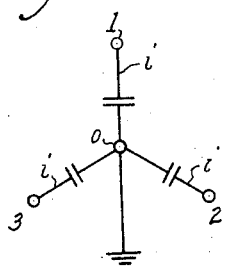
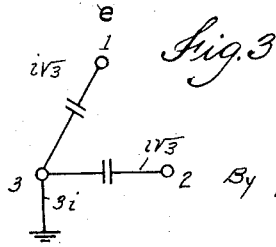

1,734,874

UNITED STATES PATENT OFFICE

SVEN NORBERG, OF VALHALLA, VASTERAS, SWEDEN, ASSIGNOR TO ALLMÄNNA SVENSKA ELEKTRISKA AKTIEBOLAGET, OF VASTERAS, SWEDEN, A CORPORATION OF SWEDEN

SELECTIVE GROUND-DETECTING RELAY

Application filed June 16, 1922, Serial No. 568,872, and in Sweden July 5, 1921.

In generating and transmitting electrical energy of the polyphase alternating current type it is customary to connect the generator and one or more feeders to common bus bars. In order to protect such a system of distribution from faults such as a ground on one of the phases of a feeder a selective relay system is associated with each feeder circuit in such manner as to disconnect the feeder from the bus bars if a fault or ground occurs on any one phase thereof.

In one relay system of which applicant is aware, the neutral point of the polyphase system is grounded with or without a damping resistance and the current flowing through this ground connection changes in magnitude or direction when a feeder becomes grounded. This change in current is utilized in obtaining a selective action of relays connected to the different feeders. In systems of this type, the utility and sensitiveness depends on the possibility of producing an artificial ground current from the neutral point to ground of sufficient strength to operate the relays.

The present invention relates to an arrangement according to which no artificial ground current is produced, but the natural capacity ground current of the system is utilized for producing the desired selective action of the relays. It can be easily shown that the said capacity current will be unevenly distributed between a grounded and a non-grounded line as regards magnitude and direction. A simple example will illustrate this fact.

In the accompanying drawings, Fig. 1 shows a diagram of connections arranged according to the present invention.

Figs. 2 and 3 are diagrammatic representations in explanation of certain mathematical statements hereinafter made.

Referring to Fig. 1, $a$ represents the bus bars of an ordinary three phase system fed from a source of power S, and $b$ and $c$ two three-phase feeders connected thereto, said three-phase feeders being for the sake of simplicity assumed to have the same capacity between each phase and the ground. If in normal operation, the capacity ground current for each phase is called $i$, a complete ground connection on one of the phases of feeder $b$ will cause the distribution of current to be considerably unsymmetrical, as illustrated in Fig. 3 of the drawing. The resulting capacity current, instead of having a zero value in normal operation, will assume the value $-3i$ for the line or feeder $b$ and $+3i$ for the line or feeder $c$, if a current flowing from the bus bars is considered as positive and it is observed that the phase angle between the currents in 1 and 2, or 5 and 6, respectively, will be 60° on the occasion of a ground.

Figures 2 and 3 serve to facilitate the understanding of these statements. The said figures are based upon the usual voltage diagram for a three-phase system. In Fig. 2, which illustrates normal conditions, the ground potential lies symmetrically with respect to the voltages of the three line conductors 1, 2, 3. The potential differences between the conductors and ground are thus represented by the vectors 0—1, 0—2, 0—3. The capacity currents are proportional to the voltages and under equal angles therewith, and their vector sum will be zero. In Fig. 3, on the contrary, where the conductor 3 is supposed to be grounded, the voltages of the two other conductors with respect to ground will be represented by the vectors 1—3, 2—3. The vector sum thereof is easily proved to be equal to three times the vector 0—3 in Fig. 2, and thus the resultant capacity current to ground will be three times the normal capacity ground current of one phase.

If the neutral point of the machine or transformer feeding the line is not grounded, the capacity ground current must return through the ground fault and through the grounded conductor 3. If, as shown in Figure 1, another line having the same capacities to ground is connected to the same bus bars, the conductor 6 of this line corresponding to conductor 3 will also have ground potential. As this line is supposed to be undamaged, conductor 6 can thus carry no capacity current. The resultant capacity current of the conductors 4, 5 must return through conductor 3 which thus must carry $-6i$. The resultant current of all conductors of line $b$ must thus be $-3i$ and of line $c+3i$.

In the case referred to, it is only the direction of the resulting capacity current with respect to ground which will be different for a grounded and a non-grounded line. If the feeders are other than three phase or if there are more than two feeders connected to the bus bars the magnitude of the current would also be different. In both cases, it is possible according to the present invention to utilize the difference in the resultant capacity current to operate relays having a selective action on the occurrence of a ground connection. For this purpose there is connected, to each line, a relay in such manner as to respond to alterations in magnitude or direction, or both, of the resultant capacity ground current for the line in question. The phase of this current always differs from that of the phase voltage of the ground phase by approximately 90 degrees, while its direction depends upon whether the line in question is grounded or not, as previously set forth.

Such an arrangement is shown in Fig. 1. Two lines $b$ and $c$ are connected to the bus bars $a$. Each line has a current transformer $h$ in zero connection feeding one coil $n$ of a relay $r$, while another coil $f$ of said relay is fed from a connection between neutral point and ground through a voltage transformer $k$ and a condenser $p$. The purpose of the condenser $p$ is to displace the phase of the small current which traverses the coil $f$, about 90 degrees with respect to the voltage, so as to bring the current in the movable coil $f$ approximately in phase, or in phase opposition, with such current in the stationary coil $n$ as is the resultant of capacity to ground currents passing over the line to which the transformer $h$ is coupled. While the two coils of the relay $r$ are conventionally shown as simply superposing their action on a common iron core, it is obvious that the relay may take any practical form, as for instance that of a wattmeter relay of the electrodynamometer type, Weston model–16, or General Electric type P, which types of wattmeter relays are operable in response to currents substantially in phase in their two windings. As the currents to be detected in the present instance are 90° out of phase with the voltage, the condenser $p$, or an inductive reactance, is used to bring them into phase so that the relay in combination with the reactance (capacitive or inductive) becomes a detector of currents and voltages primarily in quarter-phase relation. Where a relay of the inductive wattmeter type is used having incorporated therein the usual compensating coil or coils to effect the quadraphase relation between its energizing coils necessary to act on its rotor, thus making it a detector of currents in its current input or external circuit which are in phase with the voltage applied to its voltage input terminals, the reactance $p$ is necessary to shift the current in one of the input circuits 90°, thus making the relay act as a detector of only such currents and potentials in the respective outside circuits as are in quarter phase relation.

Most commercial inductive type relays are, of course, provided in themselves with suitable arrangements for causing input currents and voltages which are in phase to act on the rotor in quadraphase relation; but it will be obvious that where such relay might be obtained without the usual phase shifting means so that it could permit the input current and voltage to act on the rotor in their true phase relation making it responsive only to input currents and voltages in quarter phase relation, then the reactance $p$ would be omitted.

The relays may be arranged in different ways than those described within the scope of the invention. For instance, several relays for different lines may be combined together and certain parts may be common to them. If the lines are only two in number, a double-acting relay, for instance a wattmeter relay, in one of the lines may be substituted.

My invention may be embodied in other forms than that shown and described and I, therefore, do not wish to be restricted to the precise construction shown, but intend to cover in the appended claims all changes and modifications which are within the scope of my invention and will be apparent to those skilled in the art.

What I claim as new and desire to secure by Letters Patent of the United States is:—

1. In an alternating current distributing system including a plurality of feeders connected to common bus-bars, a relay in one of said feeders arranged to respond to the product of only the resultant capacity-to-ground current flowing in said feeder and the voltage between the system neutral and ground, and non-responsive to the product of any resultant currents in the line, which are substantially 90° out of phase with the capacity-to-ground currents, and the voltage between the system neutral and ground.

2. In an alternating current distributing system including a plurality of feeders connected to common bus-bars, a relay in at least one of said feeders capable of different action for different direction of only the resultant capacity-to-ground current in said feeder with relation to the voltage between the feeder neutral and ground, and non-responsive to the product of any resultant currents in the line, which are substantially 90° out of phase with the capacity-to-ground currents, and the voltage between the system neutral and ground.

3. In an alternating current distributing system including a plurality of feeders connected to common bus-bars, a relay associated with at least one of said feeders and having two windings, means for producing, in one of said windings, a current approximately proportional to the vectorial sum of currents in said feeder, and means for producing, in said other relay winding, a current approximately proportional and in quarter-phase relation to the voltage between the feeder neutral and ground to render the relay responsive to the vectorial sum of currents having such quarter phase relation.

4. In a polyphase distributing system having a set of distributing conductors normally insulated from ground, means for detecting a ground on one of said conductors, said means comprising an alternating current relay of the the wattmeter type having current input terminals and voltage input terminals and normally operatively responsive to current passing through the current input terminals both when substantially in phase and when substantially 180° out of phase with a voltage applied to its voltage input terminals, a current circuit connecting the current input terminals with the said distributing conductors in zero relation, a voltage circuit connecting the voltage terminals with a circuit connecting the system neutral to ground, and a condenser connected in series with said voltage connecting circuit.

5. In a polyphase distributing system having a set of distributing conductors normally insulated from ground, means for detecting a ground on one of said conductors comprising an alternating current relay of the wattmeter type having current input terminals and voltage input terminals and normally operatively responsive to current passing through the current input terminals both when substantially in phase and when substantially 180° out of phase with a voltage applied to its voltage input terminals, a current circuit connecting the current input terminals with the said distributing conductors in zero relation, a voltage circuit connecting the voltage terminals with a circuit connecting the system neutral to ground, and a reactance connected in series with one of said connecting circuits.

6. In a polyphase distributing system having a set of distributing conductors insulated from ground and a system neutral, means for detecting a ground on one of said conductors comprising, a voltage circuit connected between the system neutral and ground, a current circuit operatively connected in zero relation with said conductors, and means operatively connected with said voltage and current circuits and arranged to detect the presence in said current circuit of any resultant in quarter phase relation to the voltage between the system neutral and ground.

In testimony whereof I have signed my name to this specification.

SVEN NORBERG.